(12) United States Patent
Li et al.

(10) Patent No.: US 9,667,787 B2
(45) Date of Patent: May 30, 2017

(54) METHOD AND SYSTEM FOR VOICE TRANSMISSION CONTROL

(71) Applicant: Shanghai Xiaoi Robot Technology Co., Ltd., Shanghai (CN)

(72) Inventors: Bo Li, Shanghai (CN); Di Chen, Shanghai (CN); Pinpin Zhu, Shanghai (CN)

(73) Assignee: SHANGHAI XIAOI ROBOT TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/255,627

(22) Filed: Sep. 2, 2016

(65) Prior Publication Data

US 2017/0070612 A1   Mar. 9, 2017

(30) Foreign Application Priority Data

Sep. 6, 2015  (CN) .......................... 2015 1 0560933

(51) Int. Cl.
*H04M 1/64*     (2006.01)
*H04M 3/493*    (2006.01)
*G10L 15/22*    (2006.01)
*G10L 25/33*    (2013.01)

(52) U.S. Cl.
CPC ........... *H04M 3/4938* (2013.01); *G10L 15/22* (2013.01); *G10L 25/33* (2013.01); *G10L 2015/223* (2013.01)

(58) Field of Classification Search
CPC .. H04M 3/4938; H04M 3/493; H04M 3/4936; H04M 7/006; H04M 3/5166; H04M 2203/2066; H04M 1/72552; H04M 2201/40; H04M 2201/60; H04M 3/42059; H04M 2201/18; H04M 3/42382; H04M 3/5183; H04M 3/5191; H04M 3/5232; H04M 3/53333
USPC ....... 379/88.01, 88.13, 88.04, 218.01, 88.18, 379/10.01, 201.02, 201.03, 207.12, 379/265.07, 65.09, 265.13, 68, 69, 88.17, 379/93.01, 93.02
See application file for complete search history.

(56) References Cited

U.S. PATENT DOCUMENTS 7,099,442 B2 *  8/2006  Da Palma ......... H04M 3/42144
                                                 379/88.01
7,395,329 B1 *  7/2008  Holt ..................... H04L 12/581
                                                 709/206

(Continued)

*Primary Examiner* — Akelaw Teshale
(74) *Attorney, Agent, or Firm* — Zareefa B. Flener; Flener IP Law, LLC

(57) ABSTRACT

A method and a system for voice transmission control. The method comprises: receiving, by a voice answering device, a voice command and transmitting the voice command to a sound control server through a network data transmission channel; recognizing, by the sound control server, the voice command, generating corresponding VXML control information based on a recognition result, and transmitting the VXML control information to the voice answering device through the network data transmission channel; and performing, by the voice answering device, an operation according to the received VXML control information. With this method, the architecture and workflow of the communication system can be simplified, and the difficulty of design thereof can be reduced.

16 Claims, 3 Drawing Sheets

(56) References Cited

U.S. PATENT DOCUMENTS

| | | | | |
|---|---|---|---|---|
| 2002/0035474 | A1* | 3/2002 | Alpdemir | G06Q 30/02 704/270 |
| 2003/0002635 | A1* | 1/2003 | Koch | H04L 29/06 379/88.17 |
| 2003/0125958 | A1* | 7/2003 | Alpdemir | G10L 15/26 704/275 |
| 2004/0006478 | A1* | 1/2004 | Alpdemir | G06Q 30/02 704/275 |
| 2005/0137875 | A1* | 6/2005 | Kim | H04M 3/4938 704/270.1 |
| 2005/0152344 | A1* | 7/2005 | Chiu | H04M 3/4938 370/352 |
| 2008/0010133 | A1* | 1/2008 | Pyhalammi | G06Q 30/00 705/14.58 |
| 2010/0122334 | A1* | 5/2010 | Stanzione | G06Q 10/0637 726/11 |
| 2014/0029733 | A1* | 1/2014 | Smith | G10L 25/78 379/88.01 |

* cited by examiner

METHOD AND SYSTEM FOR VOICE TRANSMISSION CONTROL

CROSS-REFERENCE TO RELATED APPLICATIONS

This application claims the benefit and, priority of Chinese patent application No. 201510560933.0 filed on Sep. 6, 2015, the entire contents of which are incorporated herein by reference.

TECHNICAL FIELD

The present invention relates to voice transmission technology, and more particularly to a voice transmission control method and a voice transmission control system.

BACKGROUND

Currently, an enterprise application system may include an enterprise communication platform a UC system and the like. The enterprise communication platform and the UC system provide convenience for enterprise staffs. For example, the enterprise staffs may make calls to each other through the enterprise communication platform and request multimedia meetings through the UC system.

When using the enterprise communication platform or the UC system, an enterprise staff needs to search a phone number book to find a target phone number, and then input the found target phone number into the enterprise communication platform or the UC system by pressing keys manually, so as to realize corresponding communications.

In order to facilitate usability of the enterprise application system, some improvements have been made to the enterprise application system, so that the enterprise application system can be operated correspondingly based on voice commands of the enterprise staffs. However, the above-mentioned improvements result in complicated architectures and workflows of the enterprise application system as well as difficult designs.

SUMMARY

The problems to be resolved by this invention are to decrease complexity of architecture and workflow of the communication system as well as difficulty of design thereof.

Embodiments of the present invention provide a voice transmission control method, comprising: receiving, by a voice answering device, a voice command and transmitting the voice command to a sound control server through a network data transmission channel; recognizing, by the sound control server, the voice command, generating corresponding VXML control information based on a recognition result, and transmitting the VXML control information to the voice answering device through the network data transmission channel; and performing, by the voice answering device, an operation in according to the received VXML control information.

Optionally, the VXML control information is first VXML control information, the first VXML control information comprises: a storing address of a VXML dialogue table corresponding to the voice command, and a first control command for controlling the voice answering device to execute the VXML dialogue table; the performing, by the voice answering device, an operation according to the received VXML control information comprises: obtaining and executing, by the voice answering device, the VXML dialogue table according to the first control command, prompting a user to perform an inputting operation, and transmitting the voice command inputted by the user to the sound control server through the network data transmission channel.

Optionally, the VXML control information is second VXML control information, the second VXML control information comprises: an address of a VXML script corresponding to the voice command, and a second control command for controlling the voice answering device to execute the VXML script; the performing, by the voice answering device, an operation according to the received VXML control information comprises: obtaining and executing, by the voice answering device, the VXML script according to the second control command.

Optionally, the second VXML control information further comprises target number information.

Optionally, the method further comprises: converting, by a voice conversion device, the voice command received by the voice answering device into corresponding text data; wherein the transmitting the voice command to the sound control server through the network data transmission channel comprises: transmitting, by the voice answering device, the text data corresponding to the voice command to the sound control server through the network data transmission channel.

Optionally, the recognizing, by the sound control server, the voice command comprises: performing, by the sound control server, fuzzy matching for the text data corresponding to the voice command to recognize the voice command.

Optionally, the voice answering device receives the voice command through a man-machine interaction interface or through a remote control manner.

Optionally, before the receiving, by the voice answering device, the voice command, the method further comprises: receiving, by the voice answering device, a triggering operation by a user; transmitting an operation request to the sound control server according to the triggering operation; and transmitting, by the sound control server, the corresponding VXML control information to the voice answering device according to the operation request, wherein the receiving, by the voice answering device, the voice command comprises: receiving, by the voice answering device, the voice command according to the VXML control information.

Embodiments of the present invention provide a voice transmission control system, comprising a voice answering device configured to: receive a voice command, transmit the voice command to a sound control server through a network data transmission channel, and perform an operation according to the received VXML control information; and the sound control server configured to: recognize the voice command, generate corresponding VXML control information based on a recognition result, and transmit the VXML control information to the voice answering device through the network data transmission channel.

Optionally, the voice answering device comprises: a first receiving unit configured to receive the voice command; a first transmitting unit configured to transmit the voice command to the sound control server through the network data transmission channel; and an operating unit configured to perform the operation according to the received VXML control information; the sound control server comprises: a recognizing unit configured to recognize the voice command; a generating unit configured to generate the corresponding VXML control information based on the recognition result; and a second transmitting unit configured to transmit the VXML control information to the voice answering device through the network data transmission channel.

Optionally, the VXML control information generated by the generating unit is first VXML control information, the first VXML control information comprises: a storing address of a VXML dialogue table corresponding to the voice command, and a first control command for controlling the voice answering device to execute the VXML dialogue table; the operating unit is further configured to obtain and execute the VXML dialogue table according to the first control command and prompt a user to perform an inputting operation; the first transmitting unit is further configured to transmit the voice command inputted by the user to the sound control server through the network data transmission channel.

Optionally, the VXML control information generated by the generating unit is second VXML control information, the second VXML control information comprises: an address of a VXML script corresponding to the voice command, and a second control command for controlling the voice answering device to execute the VXML script; the operating unit is further configured to obtain and execute the VXML script according to the second control command.

Optionally, the second VXML control information further comprises target number information.

Optionally, the voice answering device further comprises: a second receiving unit configured to receive a triggering operation by a user before the voice answering device receives the voice command; and a third transmitting unit configured to transmit an operation request to the sound control server according to the triggering operation, the sound control server further comprises: a fourth transmitting unit configured to transmit the corresponding VXML control information to the voice answering device according to the operation request; the first receiving unit of the voice answering device is configured to receive the voice command according to the VXML control information.

Optionally, the system further comprises a voice conversion device configured to convert the voice command received by the voice answering device into corresponding text data; the first transmitting unit is configured to transmit the text data corresponding to the voice command to the sound control server through the network data transmission channel.

Optionally, the recognizing unit is configured to perform fuzzy matching for the text data corresponding to the voice command to recognize the voice command.

Optionally, the first receiving unit receives the voice command through a man-machine interaction interface or through a remote control manner.

Optionally, the voice answering device is located inside a third-party service system, the sound control server is integrated into an artificial intelligence robot.

Compared with the prior art, by using the voice answering device to receive the voice command, using the sound control server to recognize the voice command, generating the corresponding control information according to the recognition result, and finally controlling the voice answering device to perform a corresponding operation according to the control information, the architecture and workflow of transmission control for voice commands can be simplified. Furthermore, since the control information is the VXML control information, the difficulty of design of the transmission control for voice commands can be effectively reduced.

DETAILED DESCRIPTION

Although the current enterprise application systems can provide multi-party calling, call forwarding and other functions based on voice commands of enterprise staffs, the architectures and workflows of the enterprise application systems are very complicated, and the design of the enterprise application systems are very difficult.

To resolve these problems, embodiments of the present invention provide a voice transmission control method. According to this method, a voice answering device is used to receive a voice command, and a sound control server is used to recognize the voice command, and then corresponding control information is generated, the voice answering device performs a corresponding operation under control of the control information. With this method, the architecture and workflow for controlling transmission of voice commands can be simplified. Furthermore, through setting the control information as Voice Extensible Markup Language (VXML) control information, the difficulty of design of transmission control for voice commands can be effectively reduced.

In order to make the above-mentioned objects, features and advantages of the present invention more apparent, hereinafter specific embodiments of the present invention will be described in detail with reference to the attached drawings.

Figure 1:
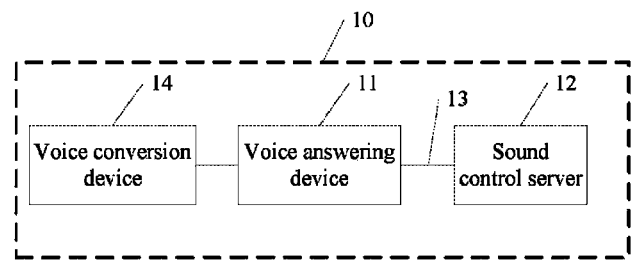
FIG. 1 is a schematic view illustrating a structure of a voice transmission control system according to an embodiment of the present invention.

As shown in FIG. 1, an embodiment of the present invention provides a voice transmission control system 10. The voice transmission control system 10 may include a voice answering device 11 and a sound control server 12. Data transmission between the voice answering device 11 and the sound control server 12 is performed through a network data transmission channel 13.

Here, the voice answering device 11 is configured to receive a voice command and transmit the voice command to the sound control server 12 through the network data transmission channel 13. The sound control server 12 is configured to recognize the voice command, generate corresponding VXML control information based on a recognition result, and transmit the VXML control information to the voice answering device 11 through the network data transmission channel 13. The voice answering device 11 is further configured to perform a corresponding operation based on the received VXML control information.

In a particular implementation, the voice command may be in a form of natural language expressed verbally by a user. The user may initiate a corresponding request or order to the voice answering device 11 with the natural language expressed verbally. A voice command may include only target object information, or only target operation information, or both of them. For example, the voice command may be "Please find Tim of Sales Department". Here, "Tim of Sales Department" is target object information. In addition, the voice command may be "Please ask John of Technology Department to attend the meeting immediately". Here, "John of Technology Department" is target object information while "to attend the meeting" is object operation information.

In a particular implementation, the voice answering device 11 may be a separate terminal device. For example, the voice answering device 11 may be a handheld device, a tablet device, a network PC, a minicomputer, a mainframe computer and the like. In addition, the voice answering device 11 may be located inside a third-party service system. For example, the voice answering device 11 may be an Interactive Voice Response (IVR) system. The specific form of the voice answering device 11 is not limited thereto, provided that the voice answering device 11 is capable of receiving a voice command, transmitting the voice command to the sound control server 12 through the network data transmission channel 13, and performing corresponding answering operations based on the control information generated by the sound control server 12.

In a particular implementation, the sound control server 12 may be a separate dedicated server, alternatively it can also provide other services. For example, a dedicated memory area and a dedicated storage area may be established in another server to provide voice control services. In addition, the sound control server 12 may be integrated into an artificial intelligence robot. Of course, no matter which form is used, the sound control server 12 can be connected with the voice answering device 11 through the network data transmission channel 13.

In a particular implementation, the network data transmission channel 13 may be a wired network data transmission channel, or a wireless network data transmission channel. Here, the wireless network may comprise WiFi, Bluetooth, infrared and other wireless connection manners. Whatever the connection manner between the voice answering device 11 and the sound control server 12 is, it shall not be construed as limitations to the present invention, instead is fallen within the scope of the present invention.

In a particular implementation, the voice transmission control system 10 further comprises a voice conversion device 14. The voice conversion device 14 is configured to convert the voice command received by the voice answering device 11 into corresponding text data. After the voice conversion device 14 converts the voice command into the corresponding text data, the voice answering device 11 transmits the text data corresponding to the voice command to the sound control server 12 through the network data transmission channel 13, and then the sound control server 12 performs corresponding processing for the text data corresponding to the voice command.

It is noted that the voice conversion device may be a separate terminal device. For example, the voice conversion device may be a handheld device, a tablet device, a network PC, a minicomputer, a mainframe computer and the like. Alternatively, the voice conversion device may be located inside a third-party service system. For example, the voice conversion device may be an Automatic Speech Recognition (ASR) system.

In order to facilitate those skilled in the art to better understand and implement the present invention, a method corresponding to the system for voice transmission control will be described in detail hereinafter.

Figure 2:
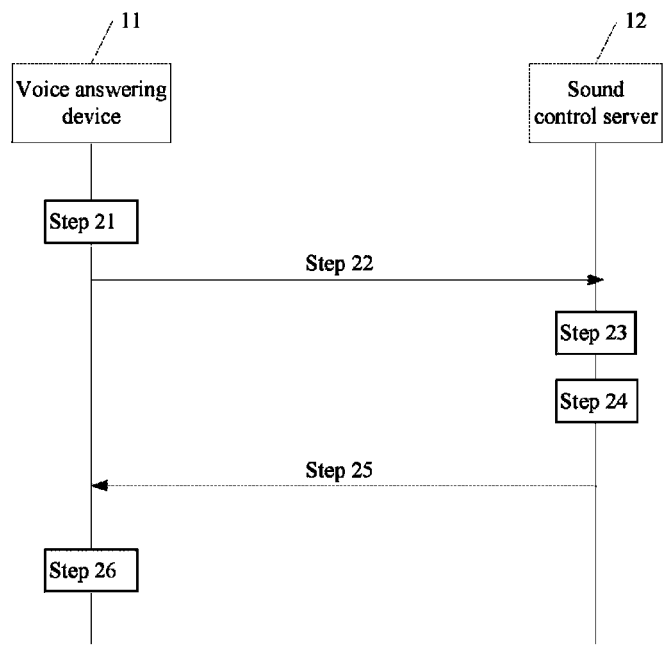
FIG. 2 is a flowchart illustrating a voice transmission control method according to an embodiment of the present invention.

As shown in FIG. 2, an embodiment of the present invention provides a voice transmission control method. The method will be described in detail further with reference to FIG. 1 below.

Specifically, the method may comprise the following steps.

At Step 21, the voice answering device 11 receives a voice command.

In a particular implementation, the voice answering device 11 may receive the voice command through various ways. For example, the voice command can be received through a man-machine interaction interface or through a remote control manner.

In a particular implementation, the voice answering device 11 may receive a triggering operation by the user before receiving the voice command. For example, a hot key "11" may be used to activate the voice transmission control system 10. After receiving the triggering operation from the user, the voice answering device 11 may transmit an operation request to the sound control server 12 according to the triggering operation. The sound control server 12 transmits corresponding VXML control information to the voice answering device 11 according to the operation request, and then the voice answering device 11 may perform a corresponding operation according to the VXML control information, for example, play a welcome message and wait for a voice command from the user, and so on. That is, the voice answering device 11 may receive the voice command under control of the VXML control information transmitted from the sound control server 12.

At Step 22, the voice command is transmitted to the sound control server through the network data transmission channel.

In a particular implementation, the voice command may be converted to corresponding text data by the voice conversion device 14 firstly, and then the text data corresponding to the voice command is transmitted to the sound control server 12 through the network data transmission channel 13.

At Step 23, the sound control server 12 recognizes the voice command.

In a particular implementation, after receiving the text data corresponding to the voice command, the sound control server 12 may recognize the voice command using a fuzzy matching method for the text data corresponding to the voice command. Here, the rules for fuzzy matching can be set by those skilled in the art based on actual application situations. For example, the text data can be converted to a corresponding phonetic string firstly, and then word separation processing is performed for the phonetic string, finally texts corresponding to the phonetic string after word separation are searched in a corpus database.

At Step 24, corresponding VXML control information is generated based on a recognition result.

In a particular implementation, the VXML control information may be first VXML control information. The first VXML control information may include: a storing address of a VXML dialogue table corresponding to the voice command, and a first control command for controlling the voice answering device 11 to execute the VXML dialog table. For example, the first control command is a command for controlling the voice answering device 11 to play voice, and the VXML dialogue table is a corresponding VXML dialog table for executing the played voice data.

Furthermore, the first control command may be a VXML control command. The VXML dialogue table corresponding to the voice command can be stored in the voice answering device 11, or in the sound control server 12, or in other devices. Medium for storing the VXML dialog table is not limited thereto, provided that the voice answering device 11 is capable of obtaining the VXML dialogue table.

In a particular implementation, the VXML control information may be second VXML control information also. The second VXML control information may include: an address of a VXML script corresponding to the voice command, and a second control command for controlling the voice answering device 11 to execute the VXML script. Furthermore, the second VXML control information may also include target number information. Here, the address of the VXML script corresponding to the voice command may be an address of a VXML script corresponding to a voice command firstly inputted by the user, or an address of a VXML script corresponding to any voice command inputted by the user during a subsequent usage period.

For example, the second control command is a command for controlling the voice answering device 11 to perform calling. In this case, the second VXML control information may also include a target number, and the VXML script is a VXML script corresponding to performing calling.

Furthermore, the second control command may be a VXML control command. The VXML script corresponding to the voice command can be stored in the voice answering device 11, or in the sound control server 12, or in other devices. Medium for storing the VXML script is not limited thereto, provided that the voice answering device 11 is capable of obtaining the VXML script.

At Step 25, the VXML control information is transmitted to the voice answering device 11 through the network data transmission channel 13.

At Step 26, the voice answering device 11 performs a corresponding operation according to the received VXML control information.

Specifically, when the VXML control information is the first VXML control information, the voice answering device 11 may obtain and execute the VXML dialog table according to the first control command, prompt the user to perform an input operation, and transmit the voice command inputted by the user to the sound control server 12 through the network data transmission channel 13.

For example, the first control command is a command for controlling the voice answering device 11 to play voice, the VXML dialogue table is a corresponding VXML dialog table for executing the played voice data, and the voice answering device 11 plays the voice to the user according to the first control command.

When the VXML control information is the second VXML control information, the voice answering device 11 may obtain and execute the VXML script according to the second control command.

For example, the second control command is a command for controlling the voice answering device 11 to perform calling, the VXML script is a corresponding VXML script for executing the calling, and the voice answering device 11 calls the target number according to the second control command.

Hereinafter a workflow of implementing a real-time teleconference using the voice transmission control system 10 will be described, taking an example in which the voice answering device 11 is an IVR, the voice conversion device 14 is an ASR and the sound control server 12 is an artificial intelligence robot.

Figure 3:
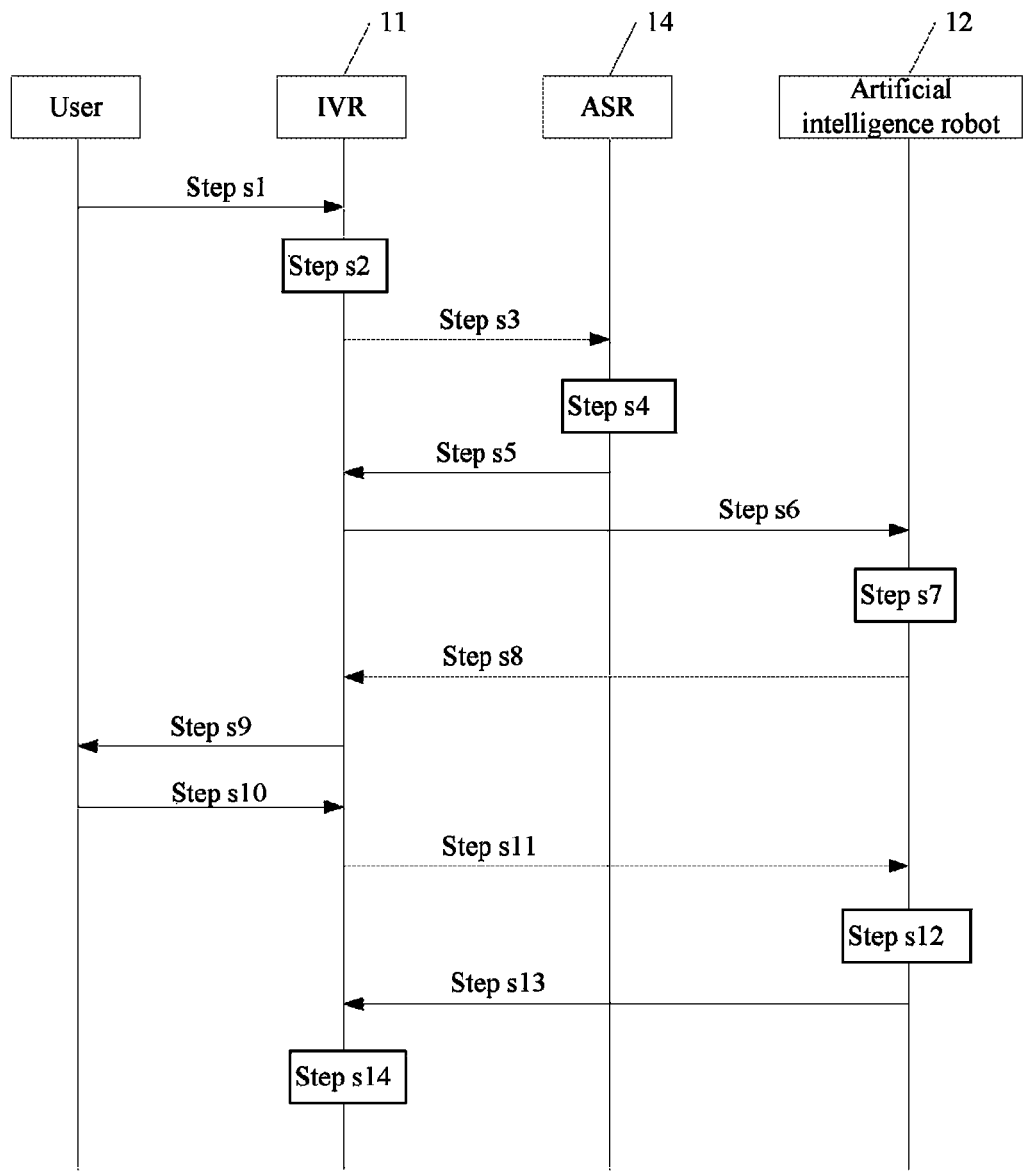
FIG. 3 is a flowchart illustrating operations of a voice transmission control system according to an embodiment of the present invention.

As shown in FIG. 3, the workflow of the voice transmission control system 10 may include the following steps:

Step s1, the user calls and accesses the IVR 11;

Step s2, the IVR 11 receives a voice command regarding the real-time teleconference;

Step s3, the IVR 11 transmits the voice command to the ASR 14;

Step s4, the ASR 14 converts the voice command into corresponding text data;

Step s5, the ASR 14 transmits the text data to the IVR 11;

Step s6, the IVR 11 transmits the text data to the artificial intelligence robot 12;

Step s7, the artificial intelligence robot 12 recognizes the text data and generates first VXML control information for controlling the IVR 11 to play voice and prompting the user to input a voice command;

Step s8, the artificial intelligence robot 12 transmits the first VXML control information to the IVR 11;

Step s9, the IVR 11 plays the voice and prompts the user to input a voice command;

Step s10, the user inputs a voice command into the IVR 11;

Step s11, the IVR 11 transmits the voice command inputted by the user to the artificial intelligence robot 12;

Step s12, the artificial intelligence robot 12 generates second VXML control information for controlling the IVR 11 to perform a calling operation based on the voice command inputted by the user;

Step s13, the artificial intelligence robot 12 transmits the second VXML control information to the IVR 11;

Step s14, the IVR 11 performs the call operation.

In order to enable those skilled in the art to implement the voice transmission control system 10 more easily, the voice transmission control system 10 will be described in detail below.

Figure 4:
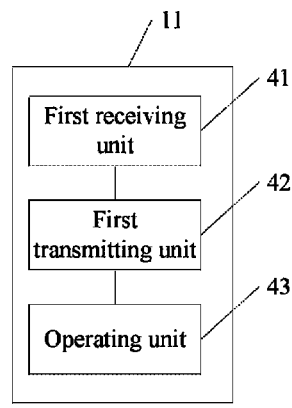
FIG. 4 is a schematic view illustrating a structure of a voice answering device according to an embodiment of the present invention.

In an embodiment of the present invention, as shown in FIG. 4, the voice answering device 11 may include a first receiving unit 41, a first transmitting unit 42 and an operating unit 43. Here, the first receiving unit 41 is configured to receive the voice command. The first transmitting unit 42 is configured to transmit the voice command to the sound control server through the network data transmission channel. The operating unit 43 is configured to perform a corresponding operation according to the received VXML control information.

Figure 5:
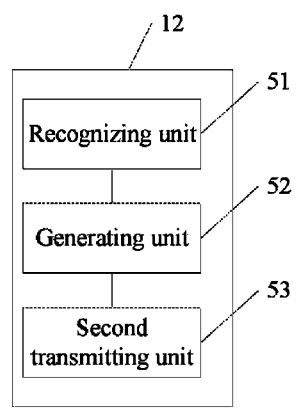
FIG. 5 is a schematic view illustrating a structure of a sound control server according to an embodiment of the present invention.

In an embodiment of the present invention, as shown in FIG. 5, the sound control server 12 may include a recognizing unit 51, a generating unit 52 and a second transmitting unit 53. Here, the recognizing unit 51 is configured to recognize the voice command. The generating unit 52 is configured to generate the corresponding control information based on the recognition result. The second transmitting unit 53 is configured to transmit the VXML control information to the voice answering device through the network data transmission channel.

Hereinafter the voice transmission control system will be described in detail with reference to FIGS. 4 and 5.

In a particular implementation, the first receiving unit 41 may receive the voice command through various ways. For example, the first receiving unit 41 may receive the voice command through a man-machine interaction interface or through a remote control manner.

After the voice command is converted to the corresponding text data by the voice conversion device 14, the first transmitting unit 42 may transmit the text data corresponding to the voice command to the sound control server 12 through the network data transmission channel 13.

After the sound control server 12 receives the text data corresponding to the voice command, the recognizing unit 51 performs fuzzy matching for the text data corresponding to the voice command to recognize the voice command. And then the generating unit 52 generates the VXML control information according to the voice command.

In a particular implementation, the VXML control information generated by the generating unit 52 may be the first VXML control information or the second VXML control information. Here, the first VXML control information includes: the storing address of the VXML dialogue table corresponding to the voice command, and the first control command for controlling the voice answering device 11 to execute the VXML dialog table. The second VXML control information includes: the address of the VXML script corresponding to the voice command, and the second control command for controlling the voice answering device 11 to execute the VXML script. Furthermore, the second VXML control information may also include target number information.

When the VXML control information generated by the generating unit 52 is the first VXML control information, the operating unit 43 is configured to obtain and execute the VXML dialog table according to the first control command, prompt the user to perform an input operation, the first transmitting unit 42 is further configured to transmit the voice command inputted by the user to the sound control server 12 through the network data transmission channel 13.

When the control information generated by the generating unit 52 is the second VXML control information, the operating unit 43 is configured to obtain and execute the VXML script according to the second control command.

In a particular implementation, the voice answering device 11 may further comprise a second receiving unit (not shown) and a third transmitting unit (not shown). Here, the second receiving unit is configured to receive a triggering operation by the user before the voice answering device receives the voice command. The third transmitting unit is configured to transmit an operation request to the sound control server according to the triggering operation.

Correspondingly, the sound control server 12 may include a fourth transmitting unit (not shown). The fourth transmitting unit is configured to transmit the corresponding VXML control information to the voice answering device according to the operation request. At this time, the first receiving unit 41 of the voice answering device 11 is configured to receive the voice command according to the VXML control information.

As can be seen from the above, the architecture and workflow of the voice transmission control system according to embodiments of the present invention are relatively simple. And through setting the control information as the VXML control information, the difficulty of design of the voice transmission control system is greatly reduced.

The person having ordinary skill in the art will appreciate that all or a part of the steps of the various methods according to the above-described embodiments may be implemented by programs instructing relevant hardware. The programs may be stored in a computer readable storage medium, such as ROM, RAM, disk or CD-ROM etc.

Although the present invention has been disclosed as above, the present invention is not limited thereto. Any person skilled in the art may make various changes and modifications without departing from the spirit and scope of the present invention. Therefore, the scope of the present invention should be defined by the claims.

What is claimed is:

1. A voice transmission control method, comprising:
   receiving, by a voice answering device, a voice command and transmitting the voice command to a sound control server through a network data transmission channel;
   recognizing, by the sound control server, the voice command, generating corresponding voice extensible markeup language (VXML) control information based on a recognition result, and transmitting the VXML control information to the voice answering device through the network data transmission channel; and
   performing, by the voice answering device, an operation according to the received VXML control information, wherein the VXML control information is first voice extensible markeup language (VXML) control information, the first VXML control information comprises: a storing address of a voice extensible markup language (VXML) dialogue table corresponding to the voice command, and a first control command for controlling the voice answering device to execute the VXML dialogue table;
   wherein the performing, by the voice answering device, an operation according to the received VXML control information comprises: obtaining and executing, by the voice answering device, the VXML dialogue table according to the first control command, prompting a user to perform an inputting operation, and transmitting the voice command inputted by the user to the sound control server through the network data transmission channel.

2. The voice transmission control method according to claim 1, wherein the VXML control information is second VXML control information, the second VXML control information comprises: an address of a VXML script corresponding to the voice command, and a second control command for controlling the voice answering device to execute the VXML script;
   wherein the performing, by the voice answering device, an operation according to the received VXML control information comprises: obtaining and executing, by the voice answering device, the VXML script according to the second control command.

3. The voice transmission controlling method according to claim 2, wherein the second VXML control information further comprises target number information.

4. The voice transmission control method according to claim 1, further comprising: converting, by a voice conversion device, the voice command received by the voice answering device into corresponding text data;
   wherein the transmitting the voice command to a sound control server through a network data transmission channel comprises: transmitting, by the voice answering device, the text data corresponding to the voice command to the sound control server through the network data transmission channel.

5. The voice transmission controlling method according to claim 4, wherein the recognizing, by the sound control server, the voice command comprises: performing, by the sound control server, fuzzy matching for the text data corresponding to the voice command to recognize the voice command.

6. The voice transmission control method according to claim 1, wherein the voice answering device receives the voice command through a man-machine interaction interface or through a remote control manner.

7. The voice transmission control method according to claim 1, before the receiving, by a voice answering device, a voice command, further comprising:
   receiving, by the voice answering device, a triggering operation by a user;
   transmitting an operation request to the sound control server according to the triggering operation; and transmitting, by the sound control server, the corresponding VXML control information to the voice answering device according to the operation request, wherein the receiving, by a voice answering device, a voice command comprises: receiving, by the voice answering device, the voice command according to the VXML control information.

8. A voice transmission control system, comprising a voice answering device and a sound control server, wherein the voice answering device is configured to: receive a voice command, transmit the voice command to the sound control server through a network data transmission channel, and perform an operation according to the received voice extensible markup language (VXML) control information;

wherein the sound control server is configured to: recognize the voice command, generate corresponding voice extensible markup language (VXML) control information based on a recognition result, and transmit the VXML control information to the voice answering device through the network data transmission channel, and wherein the voice answering device comprises:
a first receiving unit configured to receive the voice command;
a first transmitting unit configured to transmit the voice command to the sound control server through the network data transmission channel; and
an operating unit configured to perform the operation according to the received VXML control information, wherein the sound control server comprises:
a recognizing unit configured to recognize the voice command;
a generating unit configured to generate the corresponding VXML control information based on the recognition result; and
a second transmitting unit configured to transmit the VXML control information to the voice answering device through the network data transmission channel.

9. The voice transmission control system according to claim 8, wherein the VXML control information generated by the generating unit is first VXML control information, the first VXML control information comprises: a storing address of a VXML dialogue table corresponding to the voice command, and a first control command for controlling the voice answering device to execute the VXML dialogue table;

wherein the operating unit is further configured to obtain and execute the VXML dialogue table according to the first control command and prompt a user to perform an inputting operation;

wherein the first transmitting unit is further configured to transmit the voice command inputted by the user to the sound control server through the network data transmission channel.

10. The voice transmission control system according to claim 8, wherein the VXML control information generated by the generating unit is second VXML control information, the second VXML control information comprises: an address of a VXML script corresponding to the voice command, and a second control command for controlling the voice answering device to execute the VXML script;

wherein the operating unit is further configured to obtain and execute the VXML script according to the second control command.

11. The voice transmission control system according to claim 10, wherein the second VXML control information further comprises target number information.

12. The voice transmission control system according to claim 8, wherein the voice answering device further comprises:
a second receiving unit configured to receive a triggering operation by a user before the voice answering device receives the voice command; and
a third transmitting unit configured to transmit an operation request to the sound control server according to the triggering operation, wherein the sound control server further comprises:
a fourth transmitting unit configured to transmit the corresponding VXML control information to the voice answering device according to the operation request;
wherein the first receiving unit of the voice answering device is configured to receive the voice command according to the VXML control information.

13. The voice transmission control system according to claim 8, further comprising a voice conversion device configured to convert the voice command received by the voice answering device into corresponding text data;

wherein the first transmitting unit is configured to transmit the text data corresponding to the voice command to the sound control server through the network data transmission channel.

14. The voice transmission control system according to claim 13, wherein the recognizing unit is configured to perform fuzzy matching for the text data corresponding to the voice command to recognize the voice command.

15. The voice transmission control system according to claim 8, wherein the first receiving unit receives the voice command through a man-machine interaction interface or through a remote control manner.

16. The voice transmission control system according to claim 8, wherein the voice answering device is located inside a third-party service system, the sound control server is integrated into an artificial intelligence robot.

* * * * *